(12) United States Patent
Aubry

(10) Patent No.: US 11,093,039 B2
(45) Date of Patent: Aug. 17, 2021

(54) CONTROL INTERFACE FOR A MOTOR VEHICLE

(71) Applicant: DAV, Créteil (FR)

(72) Inventor: Anthony Aubry, Creteil (FR)

( * ) Notice: Subject to any disclaimer, the term of this patent is extended or adjusted under 35 U.S.C. 154(b) by 273 days.

(21) Appl. No.: 16/063,955

(22) PCT Filed: Dec. 21, 2016

(86) PCT No.: PCT/EP2016/082086
§ 371 (c)(1),
(2) Date: Jun. 19, 2018

(87) PCT Pub. No.: WO2017/108896
PCT Pub. Date: Jun. 29, 2017

(65) Prior Publication Data
US 2020/0272273 A1 Aug. 27, 2020

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC ........ G06F 3/016; G06F 3/041; G06F 3/0412; G06F 3/0416; G06F 3/04166–041662; G06F 3/044; G06F 3/0443; G06F 3/0444; G06F 3/0448; G06F 3/046; G06F 2203/04101; G06F 2203/04106–04108
See application file for complete search history.

(56) References Cited

U.S. PATENT DOCUMENTS 5,854,625 A 12/1998 Frisch et al.
2008/0122315 A1* 5/2008 Maruyama ............ H01L 41/053
310/314

(Continued)

FOREIGN PATENT DOCUMENTS

EP 2 410 407 A1 1/2012

OTHER PUBLICATIONS

International Search Report issued in PCT/EP2016/082086 dated Feb. 24, 2017 (2 pages).

(Continued)

*Primary Examiner* — Nathan Danielsen
(74) *Attorney, Agent, or Firm* — Osha Bergman Watanabe & Burton LLP

(57) ABSTRACT

The invention relates to a control interface for a motor vehicle, said interface including: a capacitive touch panel (9) including at least one locating capacitive sensor (17) defining a detecting surface and configured to locate a finger of a user on this detecting surface of the capacitive touch panel (9), and a display module (3) comprising a display screen (5). The capacitive touch panel (9) furthermore includes at least one contactless sensor (19) forming a distance meter configured to measure contactlessly a measurement value proportional to the distance between the contactless sensor (19) forming the distance meter and a metal element (7) borne by the display module (3), and the capacitive touch panel (9) is listened to the display screen (5) by way of a transparent elastic optical adhesive layer (21) allowing a relative movement between said capacitive touch panel (9) and the display screen (5) when a user presses on the capacitive touch panel (9).

16 Claims, 3 Drawing Sheets

(56) References Cited

U.S. PATENT DOCUMENTS

| | | |
|---|---|---|
| 2011/0050597 A1 | 3/2011 | Park et al. |
| 2011/0157087 A1* | 6/2011 | Kanehira ............... G06F 3/0446 345/174 |
| 2012/0098767 A1* | 4/2012 | Takai ...................... G06F 3/041 345/173 |
| 2013/0018489 A1* | 1/2013 | Grunthaner ........ H03K 17/9625 700/73 |
| 2014/0043289 A1* | 2/2014 | Stern ..................... G06F 3/0445 345/174 |
| 2014/0267128 A1 | 9/2014 | Bulea et al. |
| 2015/0268780 A1 | 9/2015 | Kim et al. |
| 2015/0378477 A1* | 12/2015 | Yoshiki ................. G06F 1/1637 345/174 |

OTHER PUBLICATIONS

Written Opinion issued in PCT/EP2016/082086 dated Feb. 24, 2017 (8 pages).

* cited by examiner

CONTROL INTERFACE FOR A MOTOR VEHICLE

The present invention relates to a control interface for a motor vehicle particularly comprising a capacitive touch panel.

In the field of motor vehicles, multifunction touch panel control interfaces are increasingly used to control electrical or electronic systems, such as an air conditioning system, an audio system or even a navigation system. Such interfaces are generally associated with a display screen and enable navigation using drop-down menus.

Several types of touch panels exist, the most common being resistive touch panels and capacitive touch panels.

Unlike resistive touch panels, capacitive touch panels comprise glass or polycarbonate plates in order to generally provide rigidity that is such that they do not deform when pressed.

As a result, in the case of capacitive touch panels, the contact force applied by the user on the surface cannot be detected.

However, in some cases this information can prove to be important in order to better interpret the commands of the user, particularly to confirm the selection made by a user in a menu, for example.

Furthermore, it is fair to say that detecting the pressure allows an additional dimension or an additional degree of freedom to be added to the touch panel that can be used in many ways.

A solution is known from document U.S. Pat. No. 5,854,625, which discloses a control interface comprising four sensors configured to also measure the pressure force applied by a finger on a passive panel.

In order to measure the pressure on the panel, the variation of the capacitance value of each capacitor is measured in order to deduce therefrom the pressure that is applied to the whole panel. The position of a finger of a user is located using force addition and subtraction computations.

However, this solution is expensive and complex to install.

Indeed, the touch panel must be suspended by springs above a support frame.

Also, locating the finger of a user using this method proves to be very imprecise.

Furthermore, the touch panel described in this document cannot be disposed directly above a display screen such as a TFT screen, for example, due to the presence of a support frame, on the one hand, and a control and command circuit suspended from the touch panel, whilst being interposed between the touch panel and the support frame, on the other hand.

Furthermore, even if the touch panel and the support frame were transparent and if the control and command circuit was moved to another location, the solution of document U.S. Pat. No. 5,854,625 would automatically raise a problem in terms of the display by the screen.

Indeed, a significant air gap would exist between the touch panel and the display screen such that the light projected by the TFT screen would be subject to multiple refractions and the image would appear blurred to a user due to birefringence phenomena.

An aim of the present invention is to propose an improved capacitive touch panel control interface allowing the pressure exerted by a finger on the capacitive touch panel to be measured, whilst being abler to be directly associated with a display screen without altering the displayed image.

To this end, the aim of the present invention is a control interface for a motor vehicle comprising:

a capacitive touch panel comprising at least one capacitive location sensor defining a detection surface and being configured to locate a finger of a user on this detection surface of the capacitive touch panel; and a display module comprising a display screen, characterized in that the capacitive touch panel further comprises at least one contactless sensor forming a distance meter configured to contactlessly measure a measurement value proportional to the distance between the contactless sensor forming a distance meter and a metal element borne by the display module, and in that the capacitive touch panel is fastened to the display screen by means of a transparent elastic optical adhesive layer allowing a relative movement between said capacitive touch panel and the display screen when a user presses on the capacitive touch panel.

The control interface can have one or more of the following features taken separately or in combination.

According to one aspect, the capacitive touch panel is, for example, of rectangular shape and the control interface comprises four contactless sensors forming a distance meter and being disposed in the vicinity of the four corners of the capacitive touch panel.

Each contactless sensor forming a distance meter particularly comprises an emission electrode and a reception electrode, a characteristic value of the contactless sensor forming a distance meter varying as a function of the distance between the emission and reception electrodes, on the one hand, and the metal element borne by the display module, on the other hand.

According to a first variation, the contactless sensor can be a capacitive sensor and, in this case, the characteristic value is the capacitance, in particular. The contactless sensor can use the same technology as the capacitive location sensor.

According to a second variation, the contactless sensor is an inductive sensor and, in this case, the characteristic value is the inductance.

According to yet another aspect, the control interface particularly comprises a computation and processing unit configured to convert the measured characteristic value into a value of the distance between the emission and reception electrodes, on the one hand, and the metal element borne by the display module, on the other hand, each distance value corresponding to a pressure value exerted on the capacitive touch panel.

Provision can be made for the thickness of the transparent optical adhesive layer to be between 0.3 mm and 2 mm, particularly 1.5 mm.

The transparent optical adhesive is, for example, a UV optical acrylate adhesive or an optical elastomer, particularly an optical silicon.

According to another aspect, the hardness of the transparent optical adhesive is between 30 and 80 Shore 00, particularly between 30 and 40 Shore 00.

The control interface can further comprise a haptic feedback unit comprising at least one vibration actuator directly or indirectly mechanically linked to the capacitive touch panel.

According to yet another aspect, the control interface comprises a styling trim frame fastened to the capacitive touch panel and said at least one vibration actuator is fastened under the lower face of the styling trim frame so as to be able to transmit haptic feedback to the detection surface of the capacitive touch panel through the styling trim frame.

Said metal element borne by the display module is particularly formed by a metal frame surrounding the display screen.

BRIEF DESCRIPTION OF THE DRAWINGS

Further advantages and features will become apparent upon reading the description of the invention, as well as from the accompanying figures, which represent a non-limiting embodiment of the invention and in which.

Throughout these figures, identical elements use the same reference numerals.

The following embodiments are examples. Even though the description refers to one or more embodiments, this does not necessarily mean that each reference relates to the same embodiment or that the features only apply to a single embodiment. Simple features of different embodiments also can be combined or interchanged in order to provide other embodiments.

Figure 1:
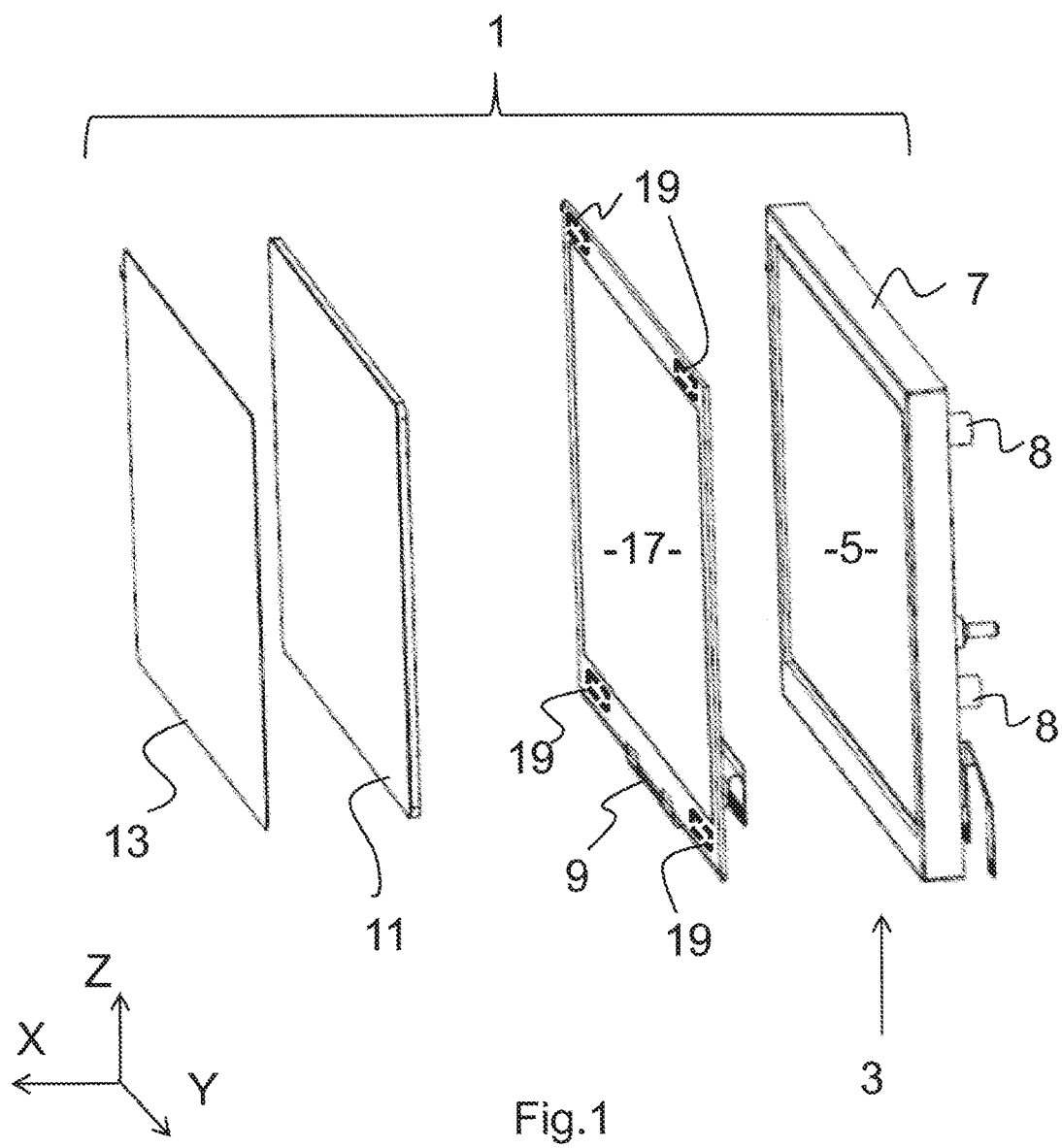
FIG. 1 shows an exploded perspective front view of a control interface according to one embodiment.

The horizontal plane (X, Y) and the vertical direction Z are denoted by the trihedron (X, Y, Z) shown in FIG. 1, which trihedron is fixed relative to a control interface 1. These axes can correspond to the designation of the axes in a motor vehicle, i.e., by convention, in a vehicle the X axis corresponds to the longitudinal axis of the vehicle, the Y axis corresponds to the transverse axis of the vehicle and the Z axis corresponds to the vertical axis of the vehicle.

DETAILED DESCRIPTION

FIG. 1 shows an exploded perspective view of a first embodiment of a control interface 1 for a motor vehicle that is arranged, for example, substantially vertically in a dashboard of the vehicle.

This control interface 1 is particularly advantageously used in a motor vehicle passenger compartment, particularly in order to be integrated in a control and display panel in order to display information relating to the functions to be controlled such as, for example, the audio, air conditioning, heating, navigation or even telephone systems.

More specifically, the control interface 1 comprises a display module 3 comprising, on the one hand, a flat screen 5, for example, a TFT screen, an LCD, LED or OLED screen and a support frame 7, which is particularly made of metal, with installation pads 8 of said flat screen 5 for fastening the control interface 1 to the structure of the vehicle.

The control interface 1 further comprises, spaced apart from the flat screen 5, a capacitive touch panel 9, a protective plate 11 and, optionally, a polarizing film 13.

The protective plate 11 is made of a transparent material such as, for example, glass or polycarbonate, that is particularly tinted, smoked or crystal and substantially has the dimensions of an opening arranged in a facade, behind which the control interface 1 must be installed. The protective plate 11 is, for example, adhered using a transparent optical adhesive on the capacitive touch panel 9.

The thickness of the protective plate 11 is selected so that the protective plate 11 with the polarizing film 13 is flush with the facade face.

By way of an example, the thickness of the protective plate 13 is between 1.6 and 2 mm and the thickness of the capacitive touch panel 9 is between 1.0 and 1.4 mm, preferably 1.2 mm.

Of course, simpler variations can be contemplated, for example, without a polarizing film 13.

Figure 2:
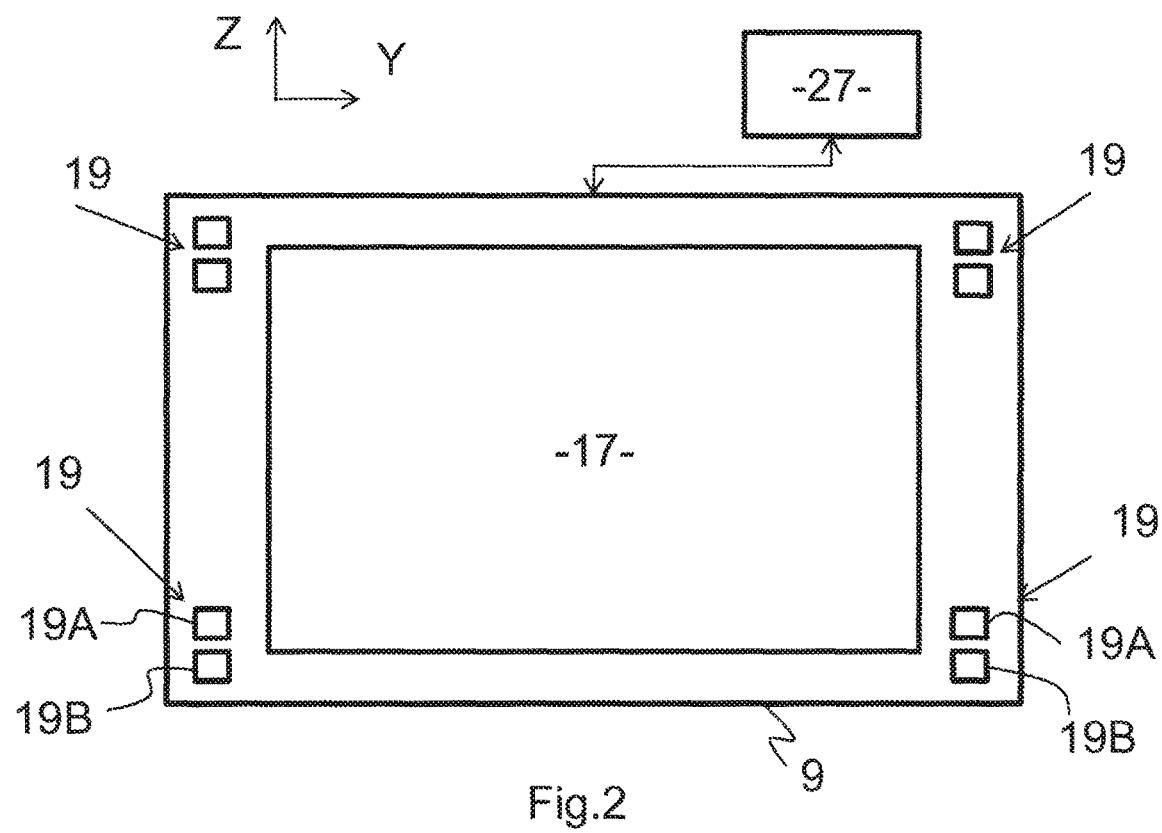
FIG. 2 shows another schematic view of the top of the control interface of FIG. 1.
Figure 3:
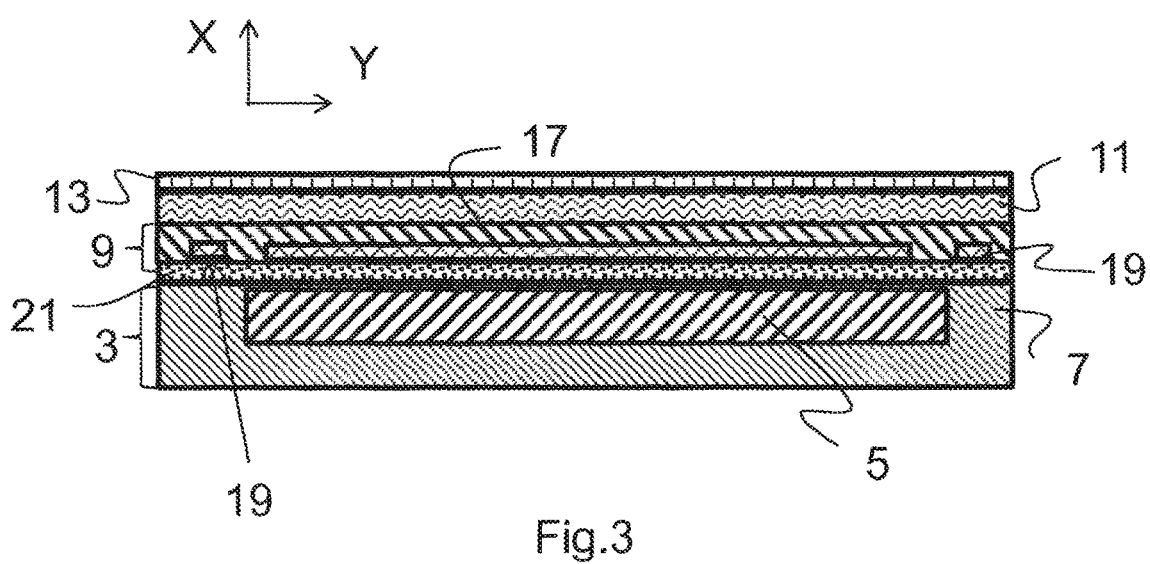
FIG. 3 shows a partial transverse section schematic view of the control interface of FIG. 1.

As can be seen in FIGS. 1 to 3, the capacitive touch panel 9 is of generally rectangular shape and comprises at least one capacitive location sensor 17 defining a detection surface and being configured to locate, with good resolution, a finger of a user.

The capacitive location sensor 17 is, for example, produced using electrodes made of a transparent electric conductor, particularly indium tin oxide (commonly called ITO) deposited onto a transparent substrate, for example, glass. Therefore, it is understood that, on the detection surface defined by the capacitive location sensor 17, the capacitive touch panel is optically transparent.

The capacitive location sensor 17 particularly allows a user to select or activate a function, such as a function of the air conditioning, navigation, car radio system or the scrolling and selection of a choice from a list, such as a telephone list.

In peripheral zones of the capacitive touch panel 9, hidden from a user, for example, due to a cover, particularly in the corners, the capacitive touch panel 9 further comprises at least one, in this case four, contactless sensors 19, each forming a distance meter and being configured to contactlessly measure a distance between the contactless sensor 19 forming a distance meter and a metal element borne by the display module 3.

The contactless sensors are capacitive or inductive sensors, for example.

These contactless sensors 19 can be integrated in the capacitive touch panel 9 in the same way as the capacitive location sensor 17. This offers the advantage of being able to manufacture the contactless sensors 19 at the same time as the capacitive location sensor 17 and of using an identical or at least similar process, which provides a significant cost reduction. Indeed, the contactless sensor 19 can be produced as a capacitive sensor using the same technology as the capacitive location sensor 17, i.e. also by depositing a transparent electric conductor made of ITO, for example, onto a transparent substrate made of glass, for example.

Each contactless sensor 19 forming a distance meter comprises an emission electrode 19A and a reception electrode 19B.

The metal element can be an added metal element, for example, in the form of a plate fastened to the display module 3, but it is better for the four contactless sensors 19 forming a distance meter to be positioned outside the detection surface of the location sensor 17 and opposite the support frame 7, which for its part is already metal and is grounded in order to protect the screen from electromagnetic disturbances. This metal support frame 7 surrounds the display screen 5.

FIG. 3, which only shows a partial section view in an X-Y plane, shows that the capacitive touch panel 9 is fastened to the display module 3 by means of a transparent elastic optical adhesive layer 21.

This transparent optical adhesive layer 21 also adheres both to the metal frame 7 and to the display screen 5 and allows a relative movement in the direction X between said capacitive touch panel 9 and the display screen 5 when a user presses on the capacitive touch panel 9. Indeed, the effect of pressing on the capacitive touch panel 9 or the protective plate 11, with or without a polarizing film 13, is to compress the transparent optical adhesive layer 21.

Thus, the transparent optical adhesive layer 21 not only fulfils the function of fixing means but also the function of damper and of transmitter of a contact force.

The thickness of the transparent optical adhesive layer 21 is between 0.3 mm and 2 mm, particularly 1.5 mm.

According to a first variation, the transparent optical adhesive is a UV optical acrylate adhesive.

According to a second variation, the transparent optical adhesive is an optical elastomer, particularly an optical silicon.

In order to allow the transparent optical adhesive layer 21 to compress, the hardness thereof is between 30 and 80 Shore 00, particularly between 30 and 40 Shore 00.

Figure 4:
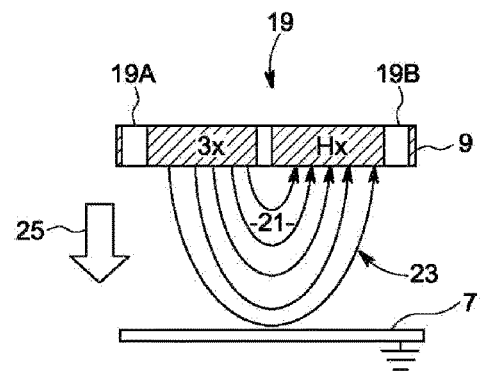
FIG. 4 shows a diagram showing the operation of the control interface of FIG. 1.

FIG. 4 shows a simplified diagram for explaining the operation of the contactless sensors 19 forming a distance meter.

Indeed, in the event that the contactless sensor 19 is a capacitive sensor, the emission electrode 19A emits an electric field, for example, an alternating field, over a given period. The field lines 23 penetrate the optical adhesive layer 21 and are deformed by the metal element formed by the frame 7 of the display module 3 in order to be received by the reception electrode 19B.

In the event that the contactless sensor 19 is an inductive sensor, the emission electrode 19A emits a magnetic field, for example, an alternating field, over a given period. The field lines 23 penetrate the optical adhesive layer 21 and are deformed by the metal element formed by the frame 7 of the display module 3 in order to be received by the reception electrode 19B.

When the capacitive touch panel 9 is pressed in the direction of the arrow 25, the electrodes 19A and 19B will approach the metal frame 7, which results in the variation of a characteristic measurement value (the capacitance in the case of a capacitive sensor and the inductance in the case of an inductive sensor) of the contactless sensor 19 forming a distance meter. When placed in a resonance or oscillation circuit, the result of the variation of the characteristic measurement value is a variation of the resonance frequency, which can be measured to determine this characteristic measurement value.

The characteristic measurement value thus can be measured for each contactless sensor 19 forming a distance meter, with each measurement value corresponding to a determined distance between the contact less sensor 19, on the one hand, and the frame 7 of the display module 3, on the other hand.

Given that the range of pressures for pressing on the optical adhesive layer 21 is a linear range complying with Hooke's law, each distance corresponds to a well-defined contact force and thus to a specific contact pressure.

Furthermore, the control interface 1 further comprises a computation and processing unit 27 (see FIG. 2) configured to convert, for example, a characteristic measurement value into a value of the distance between the emission 19A and reception 19B electrodes, on the one hand, and the metal frame 7, on the other hand, each distance value corresponding to a pressure value exerted on the capacitive touch panel 9.

Figure 5:
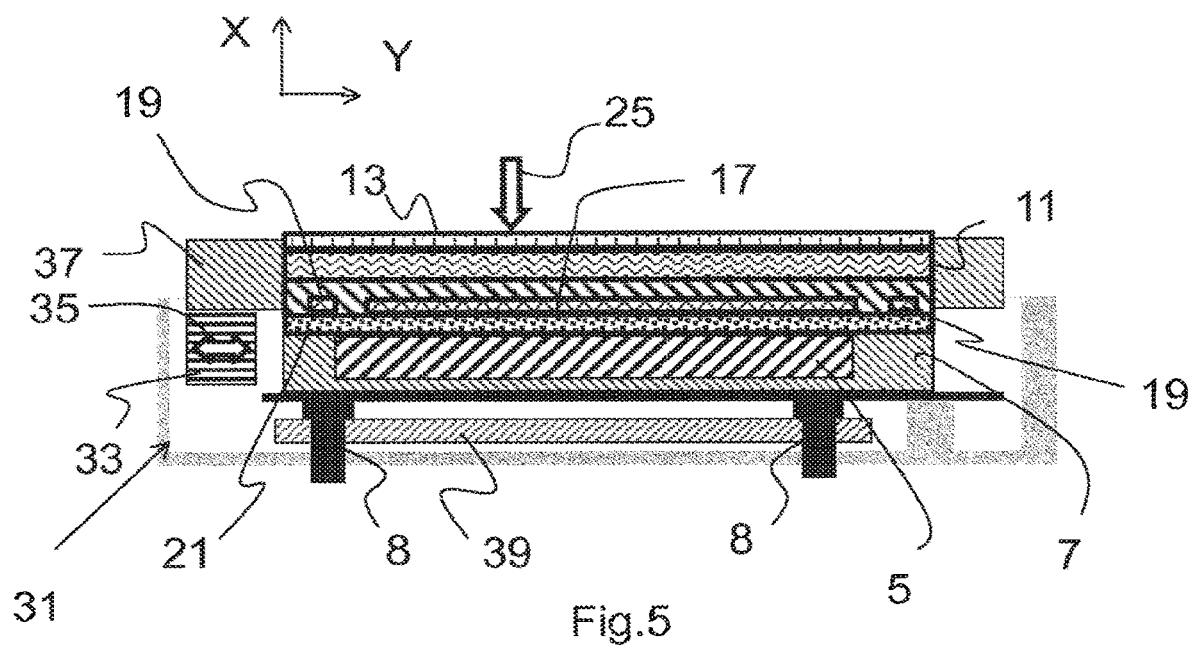
FIG. 5 shows a schematic view of a second embodiment of the control interface.

FIG. 5 shows a simplified diagram as a transverse section view of a second embodiment of the control interface 1.

This embodiment is distinct from that of FIGS. 1 to 3 in that it further comprises a haptic feedback unit 31 comprising at least one vibration actuator 33 directly or indirectly mechanically connected to the capacitive touch panel 9. The vibration actuator 33 generates, for example, a vibration in a direction in the Y-Z plane (see arrow 35). This is useful to avoid disrupting the pressure measurements in the direction X.

As can be seen in FIG. 5, the control interface 1 comprises, for example, a styling trim frame 37 intended to be integrated in the facade of the dashboard and fastened, for example, by adhesion, to the capacitive touch panel 9. The vibration actuator 33 is fastened under the lower face of the styling trim frame 37 so as to be able to transmit haptic feedback to the detection surface of the touch panel 9 through the styling trim frame 37.

Indeed, the transparent optical adhesive layer 21 allows a certain amount of relative movement in the Y-Z plane of the capacitive touch panel 9 and thus also of the protective plate 11 with the polarizing film 13 relative to the display module 3.

In order to control the vibration actuator 33, the control interface comprises an electronic board 39, such as a PCB "Printed Circuit Board", provided with microprocessors and control circuits, for example. The vibration actuator 33 and the electronic board 39 are connected by cables, not shown.

The vibration of the capacitive touch panel 9 allows the user to be provided with haptic feedback in response to a contact, such as the pressing or moving of their finger or any other activation means (for example, a stylus).

The feedback is called "haptic" since it can be perceived by touching the capacitive touch panel 9.

The vibration actuator 33 is, for example, of the ERM (Eccentric Rotating-Mass) type, also called "vibration motor" or flyweight motor. According to another example, the vibration actuator 33 is of the electromagnetic type. For example, it is based on technology similar to that of loudspeaker technology, also known as Voice-Coil technology. For example, the vibration actuator 33 is an LRA (Linear Resonant Actuator), also called "linear motor". For example, the movable part is formed by a movable magnet sliding inside a fixed coil or by a movable coil sliding around a fixed magnet, the movable part and the fixed part cooperating by electromagnetic effect. According to another example, the vibration actuator 33 is of the piezoelectric type.

Due to the suspension of the vibration actuator 33 from the lower face of the styling trim frame 37, the transparent optical adhesive layer 21 also acts as a damper for the vibrations generated by the vibration actuator 33 and limits the movement of the capacitive touch panel 9 along X toward the display module 3.

Haptic feedback can be generated in response to the detected contact, for example, when the duration and the contact force exceed a respective threshold while the finger of the user is still in contact or when the movement measurement indicates that the user is in the process of lifting their finger from the capacitive touch panel 9.

It is to be noted that the vibration of the capacitive touch panel 9 does not disrupt the measurement of the movement thereof. Firstly, since the measurement of the movement of the capacitive touch panel 9 occurs after the acquisition of the measurement. Subsequently, since the vibration of the capacitive touch panel 9 is not necessarily and only directed in the vertical direction X of the measured displacement but also can be directed in the plane (Y, Z) of the capacitive touch panel 9, and thus with little influence from vibrations in the vertical direction X of the movement measurement. Furthermore, vibration is only emitted over a very short duration, for example, less than 200 milliseconds, which hardly affects the movement measurement, which can be performed continuously. Finally, it is also possible to configure the haptic feedback unit 31 to differentiate the movement measurement from vibrations of the capacitive touch panel 9 or to determine an average movement, to be compared according to whether or not the capacitive touch panel 9 vibrates, with average movement thresholds with or without vibrations.

More specifically, the haptic feedback unit 31 can, for example, define the rate (or shape), the frequency, the phase shift, the amplitude of the acceleration, the duration of the vibration, for example, in relation to the movement of the movable part formed by the capacitive touch panel 9, the protective plate 11 and, where appropriate, the polarizing film 13, and therefore relative to the contact force exerted by the user. This dependency is, for example, a proportional relation or a mathematical rule or can be predefined in a correspondence table previously stored in the memory of the haptic feedback unit 31.

Provision also can be made, for example, for the haptic feedback unit 31 to be configured to control the vibration actuator 33 in order to generate haptic feedback only when the measured movement is greater than a triggering threshold. Programming haptic feedback as a function of triggering thresholds particularly allows a differentiation to be made between the user running their finger over the capacitive touch panel 9 and an intentional press performed in order to activate or select a command, for example. Unintentionally generating haptic feedback that could occur by inadvertently brushing against the capacitive touch panel 9 is also avoided.

Therefore, it is understood that the control interface 1 is simple and is produced from a limited number of parts.

Indeed, integrating capacitive sensors 19 forming a distance meter in the capacitive touch panel 9, and by particularly using the metal frame 7 to measure the compression between the capacitive touch panel 9 and the display module 3, substantially improves the assembly simplicity, the assembly time and the production cost.

The invention claimed is:

1. A control interface for a motor vehicle comprising:
a capacitive touch panel comprising at least one capacitive location sensor defining a detection surface and being configured to locate a linger of a user on this detection surface of the capacitive touch panel; and
a display module comprising a display screen,
wherein the capacitive touch panel further comprises at least one contactless sensor forming a distance meter configured to contactlessly measure a measurement value proportional to the distance between the contactless sensor forming a distance meter and a metal element borne by the display module, and
wherein the capacitive touch panel is fastened to the display screen by a transparent elastic optical adhesive layer allowing a relative movement between said capacitive touch panel and the display screen when a user presses on the capacitive touch panel.

2. The control interface as claimed in claim 1, wherein the capacitive touch panel is of rectangular shape and comprises four contactless sensors forming a distance meter and being disposed in the vicinity of the four corners of the capacitive touch panel.

3. The control interface as claimed in claim 1, wherein each contactless sensor forming a distance meter comprises an emission electrode and a reception electrode, a characteristic value of the contactless sensor forming a distance meter varying as a function of the distance between the emission and reception electrodes, and the metal element borne by the display module.

4. The control interface as claimed in claim 3, wherein the contactless sensor is a capacitive sensor.

5. The control interface as claimed in claim 4, wherein the characteristic value is the capacitance.

6. The control interface as claimed in claim 4, wherein the contactless sensor uses the same technology as the capacitive location sensor.

7. The control interface as claimed claim 3, wherein the contactless sensor is an inductive sensor.

8. The control interface as claimed in claim 7, wherein the characteristic value is the inductance.

9. The control interface as claimed in claim 3, farther comprising a computation and processing unit configured to convert the measured characteristic value into a value of the distance between the emission and reception electrodes, and the metal element borne by the display module, each distance value corresponding to a pressure value exerted on the capacitive touch panel.

10. The interface as claimed in claim 1, wherein the thickness of the transparent optical adhesive layer is between 0.3 mm and 2 mm.

11. The interface as claimed in claim 1, wherein the transparent optical adhesive is a UV optical acrylate adhesive.

12. The interface as claimed in claim 1, wherein the transparent optical adhesive is an optical elastomer comprising an optical silicon.

13. The interface as claimed in claim 1, wherein the hardness of the transparent optical adhesive is between 30 and 40 Shore 00.

14. The interface as claimed in claim 1, further comprising a haptic feedback unit comprising at least one vibration actuator directly or indirectly mechanically linked to the capacitive touch panel.

15. The interface as claimed in claim 14, further comprising a styling trim frame fastened to the capacitive touch panel, wherein said at least one vibration actuator is fastened under the lower face of the styling trim frame so as to transmit haptic feedback to the detection surface of the capacitive touch panel through the styling trim frame.

16. The interface as claimed in claim 1, wherein said metal element borne by the display module is formed by a metal frame surrounding the display screen.

\* \* \* \* \*

UNITED STATES PATENT AND TRADEMARK OFFICE
CERTIFICATE OF CORRECTION

| | | |
|---|---|---|
| PATENT NO. | : 11,093,039 B2 | Page 1 of 1 |
| APPLICATION NO. | : 16/063955 | |
| DATED | : August 17, 2021 | |
| INVENTOR(S) | : Anthony Aubry | |

It is certified that error appears in the above-identified patent and that said Letters Patent is hereby corrected as shown below:

On the Title Page

• Under item (65) Prior Publication Data, Line 2, insert section -- (30) Foreign Application Priority Data --.
• Under item (30) Foreign Application Priority Data, include the foreign application priority data which should read -- December 21, 2015 (FR) 1562974 --.
• At item (57) ABSTRACT, Line 13, the word "listened" should read -- fastened --.

In the Claims

• At Column 7, Claim number 1, Line number 44, the word "linger" should read -- finger --.
• At Column 8, Claim number 9, Line number 25, the word "farther" should read -- further --.

Signed and Sealed this
Fourth Day of July, 2023

Katherine Kelly Vidal
*Director of the United States Patent and Trademark Office*